United States Patent
Casagrande (10) Patent No.: US 10,873,778 B2
(45) Date of Patent: Dec. 22, 2020

(54) REDUCING DIGITAL VIDEO RECORDER STORAGE THROUGH REDUCED ENCODING OF CERTAIN PROGRAM PORTIONS

(71) Applicant: DISH Network L.L.C., Englewood, CO (US)

(72) Inventor: Steven Casagrande, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 82 days.

(21) Appl. No.: 15/915,354

(22) Filed: Mar. 8, 2018

(65) Prior Publication Data

US 2019/0281347 A1  Sep. 12, 2019

(51) Int. Cl.
  *H04N 21/4335* (2011.01)
  *H04N 21/4147* (2011.01)
  *H04N 21/433* (2011.01)
  *H04N 21/4402* (2011.01)

(52) U.S. Cl.
  CPC ..... *H04N 21/4335* (2013.01); *H04N 21/4147* (2013.01); *H04N 21/4331* (2013.01); *H04N 21/4334* (2013.01); *H04N 21/44029* (2013.01)

(58) Field of Classification Search
  CPC . H04L 65/80; H04L 65/4084; H04L 65/4069; H04L 65/60; H04L 65/602; H04N 21/23439; H04N 21/231; H04N 21/4335; H04N 21/4147; H04N 21/44029; H04N 21/4334
  See application file for complete search history.

(56) References Cited

U.S. PATENT DOCUMENTS

| | | | |
|---|---|---|---|
| 9,386,090 B2* | 7/2016 | Pavot | H04N 21/44029 |
| 10,419,756 B2* | 9/2019 | Lu | H04N 19/86 |
| 2006/0098957 A1* | 5/2006 | Jeong | H04N 5/76 386/265 |
| 2010/0309971 A1* | 12/2010 | Vanman | H04N 19/61 375/240.01 |
| 2011/0255555 A1* | 10/2011 | Alexander | H04N 21/23805 370/468 |
| 2011/0299836 A1* | 12/2011 | Amsterdam | H04N 5/765 386/295 |
| 2012/0124636 A1* | 5/2012 | Schaffer | H04N 21/222 725/131 |

(Continued)

*Primary Examiner* — David E Harvey
(74) *Attorney, Agent, or Firm* — Lorenz & Kopf LLP (57) ABSTRACT

Systems, devices and processes reduce the amount of memory or disk space needed to store encoded video content used in adaptive video streaming by eliminating certain portions of the recorded program from one or more copies of the encoded program. Content occurring before or after a scheduled start of a program, for example, can be retained in only a subset of the encoded copies so that the program content is available to be streamed, but only at certain video qualities. Commercials or other less popular portions may also be eliminated in one or more encoded copies. By eliminating the less-likely-to-be-viewed portions of the content from some (but not all) of the encoded copies, the total amount of storage space needed to store the encoded program is reduced without compromising the ability to play back all portions of the recorded program.

20 Claims, 5 Drawing Sheets

(56) References Cited

U.S. PATENT DOCUMENTS

| | | | | |
|---|---|---|---|---|
| 2012/0281115 | A1* | 11/2012 | Kouncar | H04N 21/440254 348/231.99 |
| 2014/0085501 | A1* | 3/2014 | Tran | H04N 5/23238 348/222.1 |
| 2014/0143301 | A1* | 5/2014 | Watson | H04L 69/14 709/203 |
| 2015/0256840 | A1* | 9/2015 | Sato | H04N 19/186 375/240.03 |
| 2015/0365597 | A1* | 12/2015 | Nakazono | H04N 5/23245 348/222.1 |
| 2016/0292511 | A1* | 10/2016 | Ayalasomayajula | G06K 9/00751 |
| 2017/0289591 | A1* | 10/2017 | Blohowiak | H04N 21/2407 |
| 2017/0366587 | A1* | 12/2017 | Sharifi | H04N 21/4826 |
| 2018/0287891 | A1* | 10/2018 | Shaw | H04L 67/322 |

* cited by examiner

REDUCING DIGITAL VIDEO RECORDER STORAGE THROUGH REDUCED ENCODING OF CERTAIN PROGRAM PORTIONS

TECHNICAL FIELD

The following discussion generally relates to digital video recorders. More specifically, the following discussion relates to reducing the amount of storage needed to store a recorded video program by reducing a number of copies that encode certain portions of the video program.

BACKGROUND

The digital video recorder (DVR) has dramatically changed television viewing. Rather than staying home to watch live broadcasts of television programs, many viewers are now able to digitally record broadcast programs for time-shifted viewing at a later date or time. DVRs can also facilitate pausing and rewinding of live broadcasts. Indeed, many viewers now prefer to watch even live television programming with at least some time delay to facilitate the added advantages of DVR playback.

Many set top boxes (STBs) and other conventional television receiver devices now incorporate local-storage DVRs (LSDVRs) that use a hard drive, solid state memory or the like to record programming broadcasts received by the device. LSDVR recordings can often be place shifted to other devices (e.g., mobile phones, tablets, computers or other video streaming clients), or played back locally by the receiver device itself at a later time.

More recently, remote storage DVRs (RSDVRs) have been developed to exploit the wide availability of network communications and cloud-based data storage. Rather than maintaining a video recording on a user's home device, an RSDVR typically uses a network server to store recorded programs that can be streamed to any number of television receivers, mobile phones, tablets and/or other devices for playback. The RSDVR can provide improved scalability and reliability over the LSDVR, and can often provide improved placeshifting performance as well.

One challenge that arises, however, is the amount of data storage that is usually needed to store copies of programs that are recorded by the DVR. This problem is compounded when the video stream is delivered using adaptive streaming techniques. Adaptive streaming typically requires that the video server maintain multiple copies of the recorded program, each encoded with a different bitrate (or other quality-related parameter). To play back the recorded stream, the user's client device typically requests segments of the video stream from the different copies as needed to maximize video quality while optimizing delivery over then-current network conditions. That is, the client device requests segments from a lower-quality copy when network congestion or other factors restrict the amount of data that can be transmitted in the available time. When sufficient bandwidth and computing capability exists, however, higher quality segments can be requested to facilitate better playback quality. Although adaptive streaming has been widely adopted, the multiple copies of the adaptively-streamed program can consume a relatively large amount of storage space on the video server.

It is therefore desirable to create systems and methods to reduce the amount of storage needed to store programming recorded by a digital video recorder. Other desirable features and characteristics will become apparent from the subsequent detailed description and the appended claims, taken in conjunction with the accompanying drawings and this background section.

BRIEF SUMMARY

Various embodiments provide systems, devices and processes to reduce the amount of memory or disk space needed to store encoded video content by eliminating certain portions of the recorded program from one or more encoded copies. Content occurring before or after a scheduled start of a program, for example, can be retained in only a subset of the encoded copies so that the program content is available to be streamed, but only at certain video qualities. By eliminating the less-likely-to-be-viewed portions of the content from some (but not all) of the encoded copies, the total amount of storage space needed to store the encoded program is reduced. The amount of storage that is saved will vary from embodiment to embodiment, but can be significant, particularly if the content is eliminated from the highest quality encodings of the recorded program.

Some examples provide an automatic process executable by a video encoder, RSDVR or other computing device to store a recorded program on a storage medium for playback as an adaptive media stream. The process suitably comprises: determining a portion of the recorded program that is most likely to be viewed by a viewer and at least one portion of the program that is less likely to be viewed by the viewer; encoding a plurality of encoded copies of the recorded program; and storing the plurality of encoded copies of the recorded program on the storage medium for subsequent retrieval, wherein a first subset of the plurality of encoded copies stored on the storage medium comprises the entire recorded program, and wherein a second subset of the plurality of encoded copies stored on the storage medium comprises only the portion of the program that is most likely to be viewed by a viewer and omits the at least one portion of the program that is less likely to be viewed by a viewer.

Other embodiments provide an RSDVR, video encoder or other computing device that comprises a processor, a data storage and an interface to a network, wherein the processor executes an automated process to deliver an adaptive media stream on the network representing a recorded program that is stored on the storage device. The automated process suitably comprises determining a portion of the recorded program that is most likely to be viewed by a viewer and at least one portion of the program that is less likely to be viewed by the viewer; encoding a plurality of encoded copies of the recorded program; and storing the plurality of encoded copies of the recorded program on the storage medium for subsequent retrieval, wherein a first subset of the plurality of encoded copies stored on the storage medium comprises the entire recorded program, and wherein a second subset of the plurality of encoded copies stored on the storage medium comprises only the portion of the program that is determined to be most likely to be viewed by a viewer and omits the at least one portion of the program that is determined to be less likely to be viewed by a viewer.

In some embodiments, the less-likely-to-be-viewed portions are determined prior to the encoding (e.g., based upon data received from an electronic program guide, content management system or the like). Pre-encoding determination could facilitate encoding of only the more-likely-to-be-viewed portions, thereby conserving encoder resources as well as storage space. Alternately, the entire program could be initially encoded for multiple copies, but certain portions could be discarded or deleted from storage for one or more copies of the program, thereby conserving storage space. To that end, some embodiments could allow the more or less likely-to-be-viewed portions to be determined even after encoding is complete. Various other embodiments could be modified in many ways.

Various additional examples, aspects and other features are described in more detail below.

BRIEF DESCRIPTION OF THE DRAWING FIGURES

Example embodiments will hereinafter be described in conjunction with the following drawing figures, wherein like numerals denote like elements, and.

DETAILED DESCRIPTION

The following detailed description is intended to provide various examples, but it is not intended to limit the invention or the application and uses of the invention. Furthermore, there is no intention to be bound by any theory presented in the preceding background or the following detailed description.

According to various embodiments, storage space on a remote storage or other digital video recorder (DVR), video server, video encoder or other computing system can be conserved by eliminating the portions of media programs that are less likely to be viewed from some, but not all, of the stored copies of the program. The omitted portions can include, for example, the recorded portions occurring just prior to or just after a scheduled recording. Further embodiments could alternately or additionally restrict encoding of commercials or other portions that are less likely to be watched, as desired.

Eliminating the less-viewed portions from some, but not all, of the encoded copies of a recorded program preserves the ability to view the relevant portions (albeit possibly at a lower playback quality) while reducing the amount of storage space consumed by the recorded program. To provide an example, many DVRs routinely record an extra minute or so prior to a program's scheduled starting time, along with an extra three minutes or so after a program's scheduled end time to be sure that the recording captures any lead-in or post-credit content associated with the program that the viewer does not want to miss. Often, these pre- and post-recording times are configurable by the viewer, so the actual times can vary from embodiment to embodiment. To continue this example, however, the four minutes of pre- and post-content make up about 6.25% of an hour program, or about 12.5% of a half hour program. Eliminating this content from one or more of the multiple encoded copies used for adaptive streaming can reduce the amount of storage by a significant amount, particularly if the content is eliminated from the higher quality encodings. The skipped content is preserved in at least one (ideally several) of the different encodings so that the content can be viewed if desired, albeit possibly at a lower quality. Most viewers, however, will not mind (or even notice) a limited amount of quality degradation in the content occurring before or after the program's scheduled times. Similar concepts could be applied to reduce the encodings of commercial breaks and/or other portions of the program that are more likely to be skipped, or when the content is less likely to be viewed.

Figure 1:
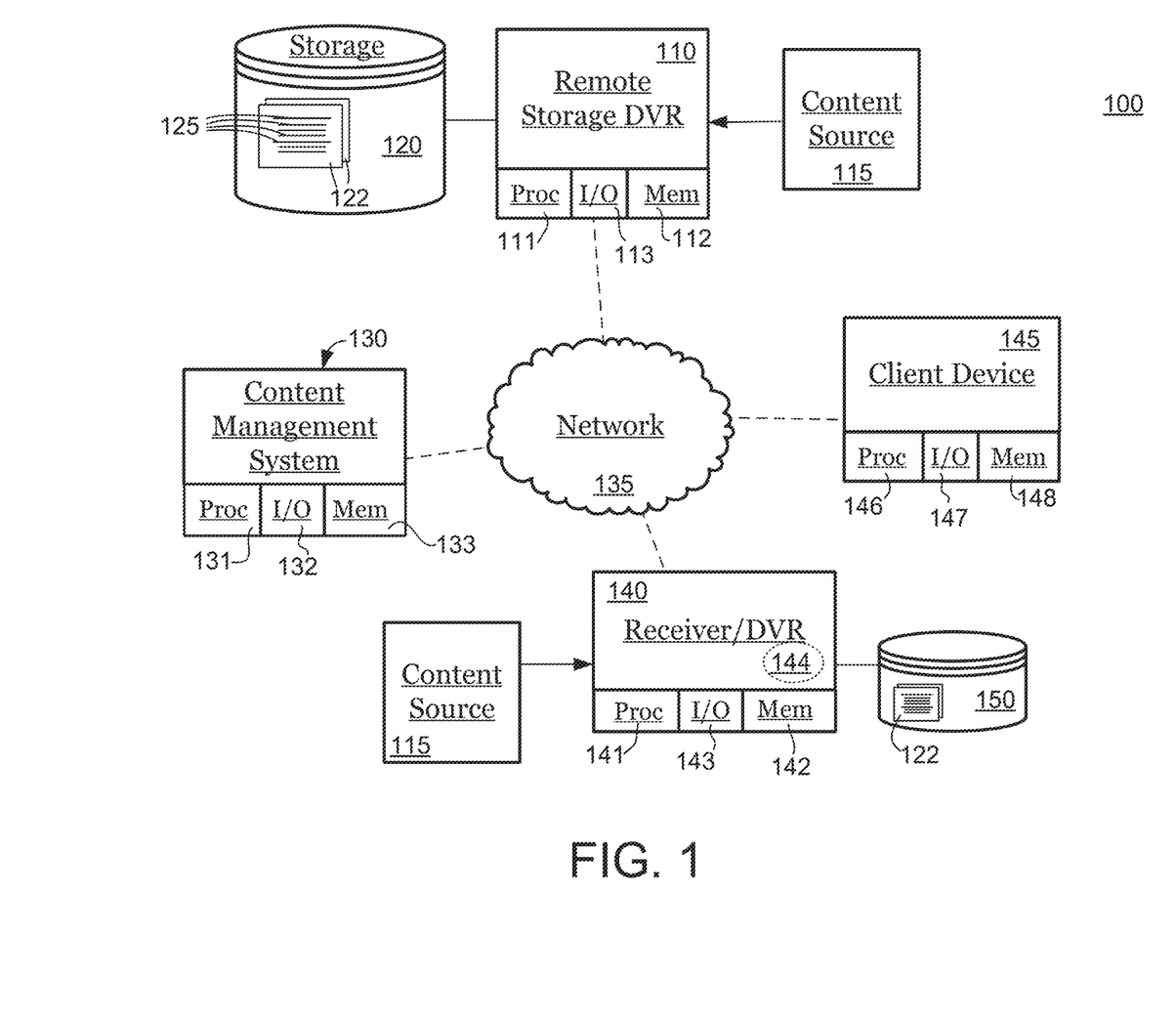
FIG. 1 illustrates one example of an RSDVR system.

With reference now to FIG. 1, an example system 100 to record and deliver video programming includes a DVR system capable of recording received broadcast programming. In the example of FIG. 1, an RSDVR system no suitably records and encodes programs 122 for storage and retrieval from data storage 120. FIG. 1 also shows an LSDVR 144 implemented within a set top box (STB) or similar television receiver 140. In practice, the concepts described herein may be equivalently implemented in any sort of RSDVR, LSDVR, video-on-demand (VOD) or similar streaming system and/or any other system in which multiple encoded copies of broadcast or other media programs are maintained.

RSDVR system no is any sort of remote storage video recorder that is capable of encoding and storing video content obtained from any source. Typically, RSDVR system no is implemented using conventional computing hardware such as any sort of processor 111, memory 112 and input/output interfaces 113 as would be expected in a cloud or other network based computer server system. One example of an RSDVR system no is described in US Patent Publication No. 2016/0366489, although equivalent embodiments may be formulated with any sort of hardware and software.

RSDVR system no receives content from any program source 115. Programs may be received, for example, via any sort of terrestrial, satellite, cable, "over the top (OTT)" or other broadcast source 115. Equivalently, programs may be received in raw format via file-based or streaming downloads received via network 135 or the like.

Typically, RSDVR system 120 initially stores programs 122 in an MPEG or similar "raw" format as the program is received. For programs that are made available for adaptive streaming, RSDVR system 120 (or equivalent hardware) suitably encodes the raw content into several encoded copies 125, each having different encoding parameters for bitrate, frame rate, resolution and/or other quality parameters as desired. Any number of different copies 125 may be encoded and stored for subsequent video streaming. At least two copies 125 will be encoded to provided "high" and "low" quality streams, although most modern adaptive streaming techniques will encode five or more copies, often ten or more. The various copies will have varying quality parameters to support high quality playback as well as streaming over lower bandwidth connections, as desired. Several examples of adaptive video streaming techniques are described in US Patent Publication No. 2008/0195743, although equivalent embodiments may use other streaming techniques as desired.

In the example of FIG. 1, RSDVR system no stores recorded television or other media programs 122 in storage 120. Storage 120 may be implemented with any sort of magnetic, optical, solid state or other storage media, including any sort of hard drive(s) and/or solid state memory. Other embodiments may store programs 120 and/or encoded copies 125 in other storage associated with RSDVR 110, including any sort of content delivery network (CDN) or other cloud-based storage as desired. RSDVR system no may also include separate memory or mass storage for cache operations, as desired.

As noted above, some of the encoded copies 125 that are stored in storage 120 may omit portions of the program recording that are less likely to be viewed, thereby reducing the amount of disk space that would otherwise be required to store that copy 125. In various embodiments, the portions that are less likely to be viewed can correspond to the recorded portions occurring prior to a scheduled starting time of the program, continuing after a scheduled ending time of the program, commercials, and/or other portions of the program as desired. The scheduled start and end times may be determined by the RSDVR 110 from an electronic program guide (EPG) service or other schedule, or in any other manner.

In some further embodiments, the RSDVR system no can obtain information about the recorded program 122 from a content management system 130 or the like operating on network 135. Content management system 130 is a computerized service implemented with conventional processor 131, memory 132 and input/output interfaces 133 as desired. Content management system (CMS) 130 may be a conventional electronic program guide (EPG) service in some implementations. In other embodiments, CMS 130 may be a service that monitors actual broadcast programming and that provides information about the programs 122 that is useful to the RSDVR system 110. CMS 130 could, for example, provide actual start and/or end times of recorded programs 122 to RSDVR 120, thereby enabling more accurate determination of program portions that are more or less likely to be viewed. CMS 130 could also indicate portions of the programs 122 that correspond to commercial breaks, or portions of the program that are less exciting (e.g., downtime in a sports broadcast) when the recorded program is more likely to be skipped over, and therefore less likely to be watched. This determination may be performed in any manner. One example of a content management system (CMS) is described in US Patent Publication No. 2017/0208369, although equivalent embodiments may use any other hardware, software and other implementation features as desired.

CMS information may be provided to the RSDVR system no in real-time (or near real-time, accounting for some inherent processing, communications and data collection delay) in some embodiments. Other embodiments could provide CMS information after the broadcast is initially recorded, but before the adaptive streaming copies 125 are encoded. Other embodiments may omit CMS information entirely, and simply identify the less-watched program content based upon clock time and/or comparisons to EPG or other schedules, as desired.

Programs 122 that are stored by RSDVR system no may be requested and streamed to any number of playback devices 145, as desired. In the example of FIG. 1, a media player client device 145 represents any sort of device that executes media player software or firmware on any sort of conventional hardware, including processor 146, memory 147 and input/output interfaces 148. Examples of media client devices 145 could include, without limitation, any sort of mobile phone, tablet, personal computer, video game player, media streaming device and/or the like. Programs 122 could also be streamed to a STB or similar media receiver 140, as desired. Typically, the media player client device 145 selects a sequence of video segments from the available copies 125 of the program 122 according to the processing and network resources that are available to the client 145 at that time. The segments may be "mixed and matched" from the different copies according to a time index or the like to create an adaptive stream that is customized to the then-current capabilities and network conditions observed by the particular client 145.

As noted above, the concepts described with respect to RSDVR system 110 could be equivalently applied to LSDVRs or any other digital recording devices. FIG. 1 illustrates an LSDVR 144 implemented within a media receiver 140 that stores media programs 122 received from a satellite, cable, OTT or other video source 115 in a DVR or other storage 150. In implementations that perform adaptive encoding of recorded programs, the concepts of excluding certain portions of the program from certain encodings could equivalently reduce the amount of disk or other storage space needed, thereby providing more efficient storage of recorded programs 122 on storage 150.

Figure 2:
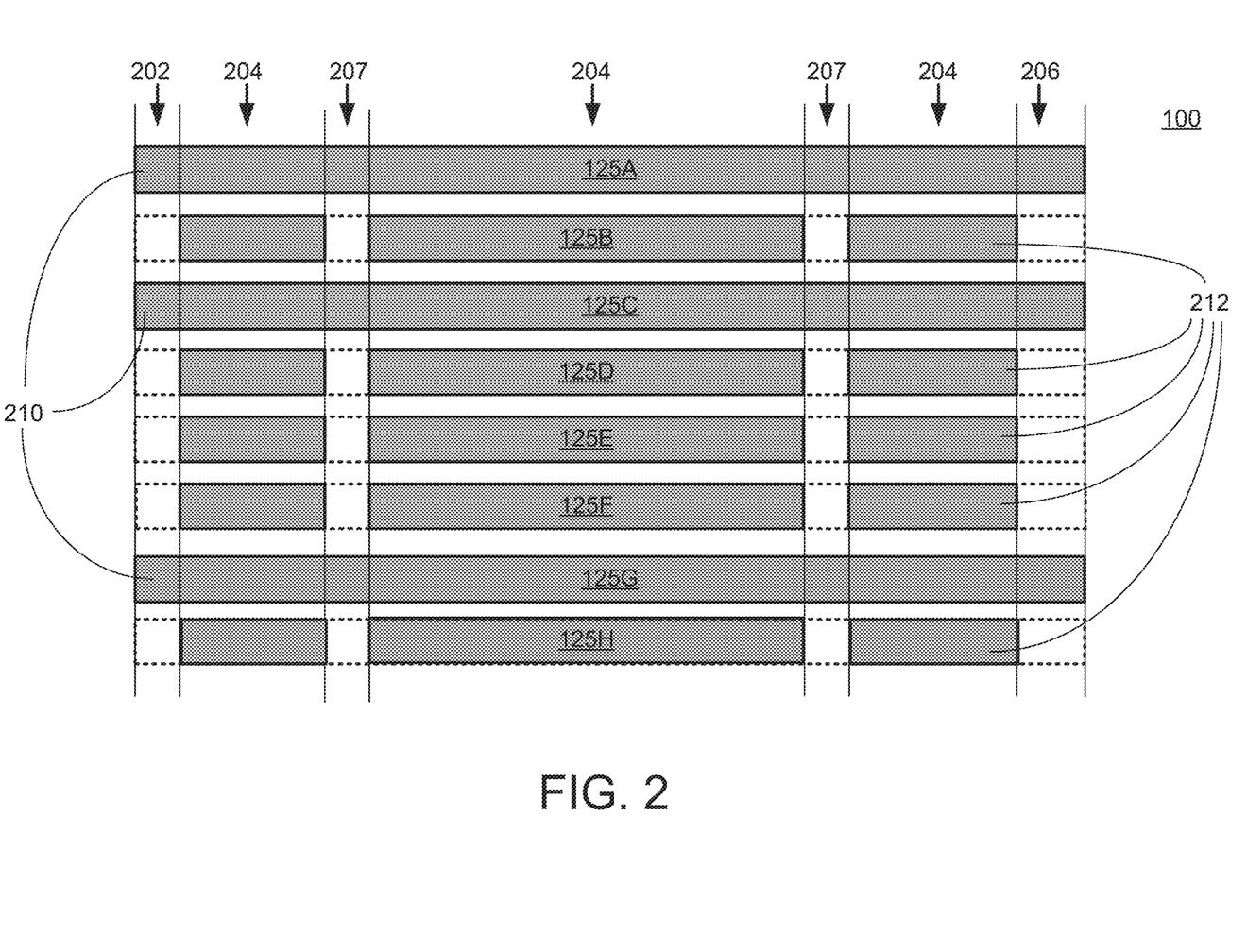
FIG. 2 illustrates an example scheme for encoding different copies of a media program.

FIG. 2 illustrates a set 200 of copies 125 that could be used to represent a particular program 122 for adaptive streaming. In this example, eight copies 125A-H are shown, although other embodiments could scale the concepts described herein to any number of different copies, depending upon the variation in quality and bandwidth that is desired for the particular implementation. In one example, a lowest encoding quality copy 125A may be made at a bitrate of about 145 kbps or so to support streaming over mobile phone networks, and a highest quality copy 125H may be made at a bitrate of 7800 kbps or so to support full digital resolution over a LAN or similarly fast network. Any number of other copies 125B-G may be made with various intervening bitrates to support varying quality levels and distribution over a variety of networks. Quality may be equivalently varied by adapting frame rate, resolution and/or other encoding parameters as desired.

As noted above, each of these different encoding copies 125A-H includes portion 204 of the program, which is the portion that is most likely to be viewed by the viewer. Portions 202 and 206 of the program corresponding to the portions before and after the scheduled time of the program, respectively, are less likely to be viewed, and are therefore omitted from some of the copies 125 to preserve storage space. Similarly, portions 207 representing commercial breaks or other less interesting portions of the program can be omitted from some copies 125 to further preserve storage, as desired. In the example of FIG. 2, only a few copies 125A, 125C and 125G are encoded to include portions 202 and 206, as well as portions 207. These copies 125A, 125C and 125G therefore make up a first subset 210 of copies 125 capable of playing back the entire program. The other copies 125B, 125D-F, and 125H do not include portions 202 and 206, thereby reducing the amount of storage required for these copies. These "shorter" encodings make up a second subset 212 of copies that do not include the portions 202, 206 and/or 207 that are less likely to be viewed. By including In the example of FIG. 1, the set 210 of "complete" copies includes a low-quality stream 125A, a medium-quality stream 125C and a higher quality (but not "highest" quality) stream 125G. This allows the player 145 some flexibility in requesting streams to provide quality vs. bandwidth tradeoffs even though the full range of quality levels may not be available for portions 202, 206 and 207. If the network 135 will support streaming from copy 125H, for example, the degradation to copy 125G during portions 202, 206 and 207 may still be acceptable (or even unnoticeable) to many viewers. By providing the less-viewed portions 202, 206 and 207 in some but not all of the available copies, the space consumed on storage 120 can be reduced, especially if the portions 202, 206 are omitted from the highest quality copies.

FIG. 2 is intended only as an illustrative example. Practical embodiments may use any number of different copies 125 encoded according to any number of different parameters. Similarly, any number of copies 125 having any quality parameters may be selected to include the full content of program 122. Although greater storage savings will be realized from excluding lesser-viewed portions 202, 206, 207 from the highest quality recordings, the particular encoding schemes used will vary widely from embodiment to embodiment.

References to storing the "entire" program are intended to encompass equivalent embodiments wherein fluctuations in computing capabilities, telecommunications or network conditions and other factors may result in insubstantial portions of the program being omitted, as well as slight variations between copies that are inherent in digital video processing. It may also be possible to intentionally omit some portion of the program from some or all of the copies 125 or for slight variations between copies 125 to exist without deviating from the general concept of retaining the most-likely-to-be-viewed portions while discarding the less-likely-to-be-viewed portions from one or more stored copies of the encoded program that is described herein.

Figure 3:
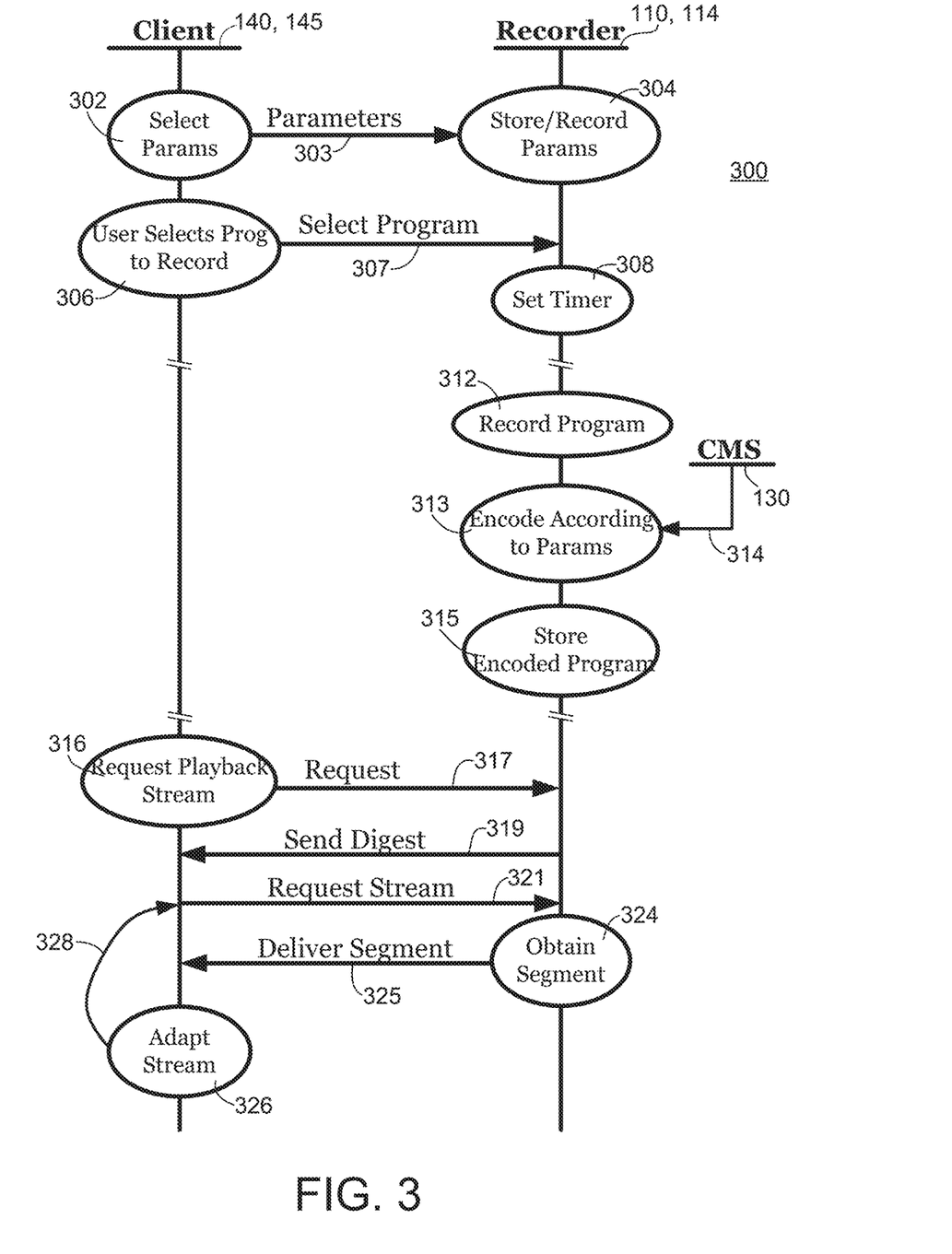
FIG. 3 is a diagram of an example process to reduce the storage consumed by certain copies of a media program.

FIG. 3 shows an example process 300 for adaptively streaming video content using several of the concepts set forth above. Process 300 may be performed by an LSDVR, RSDVR or similar recording/streaming device or system.

As noted above, many video recorders are programmed to record a minute or so of content prior to the scheduled start of the program. Several minutes of programming may also be recorded after the scheduled end of the program. In various implementations, the particular parameters relating to the amount of pre- and post-recording time can be set by a viewer, as desired. In the example illustrated in FIG. 3, a viewer selects desired parameters for pre- and post-recording using a menu or other interface associated with a client device 145. These parameters are appropriately transmitted 303 to the DVR device 110/144 for subsequent storage (function 304) and use. Pre- and post-recording times may not be configurable in all embodiments, and other embodiments may set the parameters according to default values (e.g., values set in firmware of the recording device), or according to any other techniques.

In conventional DVR operation, a user selects programs to record (function 306), and this information 307 is transmitted to the DVR device to set a recording timer (function 308). In various embodiments, the client and/or the DVR device consults an EPG (or CMS 130) to obtain scheduling information, including a start and end time, as well as channel or network information for the selected program. The timer set by the DVR is typically based upon information obtained from this schedule. The timer may be adapted, however, according to the previously-set parameters (e.g., the pre- and post-recording time), or according to other factors as desired. To that end, the program 122 is typically recorded starting at a time that is a minute or so prior to the scheduled start (function 312), as desired.

Encoding to adaptive streaming formats may occur at any time (function 313). In various embodiments, encoding occurs while the program is being recorded so that the program 122 is ready for streaming as soon as possible. Other embodiments may wait until the recording is complete, until a video stream is requested by a client device, until encoding resources become available, and/or until other conditions occur as desired. The encoding process formats the various copies 125 as desired to support adaptive streaming on network 135; as noted above, some of the copies 125 may not include the less-likely-to-be-viewed portions 202, 206 and 207 as desired.

In some embodiments, the encoding is further modified based upon information received from CMS 130. As noted above, CMS 130 may provide information 314 about other portions of the program 122 that are less likely to be viewed. Such portions may include commercials or other portions 207 of the program that are less exciting, as appropriate. Encoding and/or storage of these less-interesting portions of the program may be restricted in a manner similar to that described herein for pre- and post-scheduled content 202 and 206, respectively.

Various embodiments of CMS 130 may also provide a more accurate start and end time for the program 122, thereby allowing more accurate identification of pre- and post-program content 202 and 206. If a program 122 begins later than expected (e.g., due to an overrun by a previous program), the pre-program portion 202 can be extended based upon information from the CMS 130, as desired. Similarly, if a program runs longer than expected, the post-program portion 206 can be modified to reflect the later-than-expected end time. CMS data 314 may also be used to identify commercial breaks, or for any other purpose.

The encoded copies 125 of program 122 are stored as desired for subsequent streaming (function 315). As noted above, a subset 210 of copies 125 will include the entire program, including less-viewed portions 202, 206 and 207, whereas the remaining set 212 of copies will include encode only the most-viewed portion of the program, without encoding portions 202, 206 and 207.

Client devices 140, 145 adaptively stream the content from the remotely-located DVR by requesting the stored program. Typically, the user will select the desired program from a menu or other list of available programs (function 316). The user's selection triggers a request 317 to the DVR for the identified program.

In response, the DVR typically returns a digest 319 that describes the available copies 125 of the requested program 122. This digest 319 may indicate which copies 125 have the complete program 122, and which copies 125 only have the most-viewed portion 204. Often, the digest will delineate the various portions 202, 204, 206 and 207 by presentation time stamp (PTS) or other time-based markers, as appropriate. Equivalent embodiments may not identify specific clock or program times, but will rather indicate the availability or unavailability of stream segments during various portions of the program. The client device 140/145 will react by only requesting segments from those copies 125 that have the requested content for the relevant timeframe.

In other embodiments, the digest 319 may describe all of the copies 125 without regard to the un-encoded segments 202, 206 and 207. In such embodiments, the DVR server may respond to request for unavailable segments by providing the equivalent segments from lower-quality copies. That is, if the client requests a 1500 bps copy of program content that is not encoded at that quality, the server could automatically respond with a 1200 bps segment of the requested content instead of the requested higher-quality segment. The player would then play back the lower-quality segment in place of the requested higher-quality segment, as desired.

Client 140/145 therefore requests segments (function 321) of the various copies 125 from the DVR 120 as appropriate. The DVR responds to requests 321 by responsively obtaining the requested segment from the appropriate copy 125 (function 324) and delivering the obtained segment to the requesting media client 325. The player renders the received segment for playback to the viewer, and requests additional segments as desired (function 326). The player therefore requests and receives segments from the various copies to adaptively obtain the entire program for playback (function 328).

As noted above, the "missing" portions may be skipped, discarded or otherwise eliminated from certain copies 125 in any manner. Various embodiments could avoid encoding the less-viewed portions 202, 206, 207 at all for certain copies, whereas other embodiments could initially encode the entire program for all of the copies, but then eliminate the less-viewed segments from storage. Segments 202, 206, 207 may be eliminated from storage on an a priori basis (e.g., by storing only the more-likely portion 204), or by purging the less-likely portions 202, 206, 207 at some time after initial storage.

Figure 4:
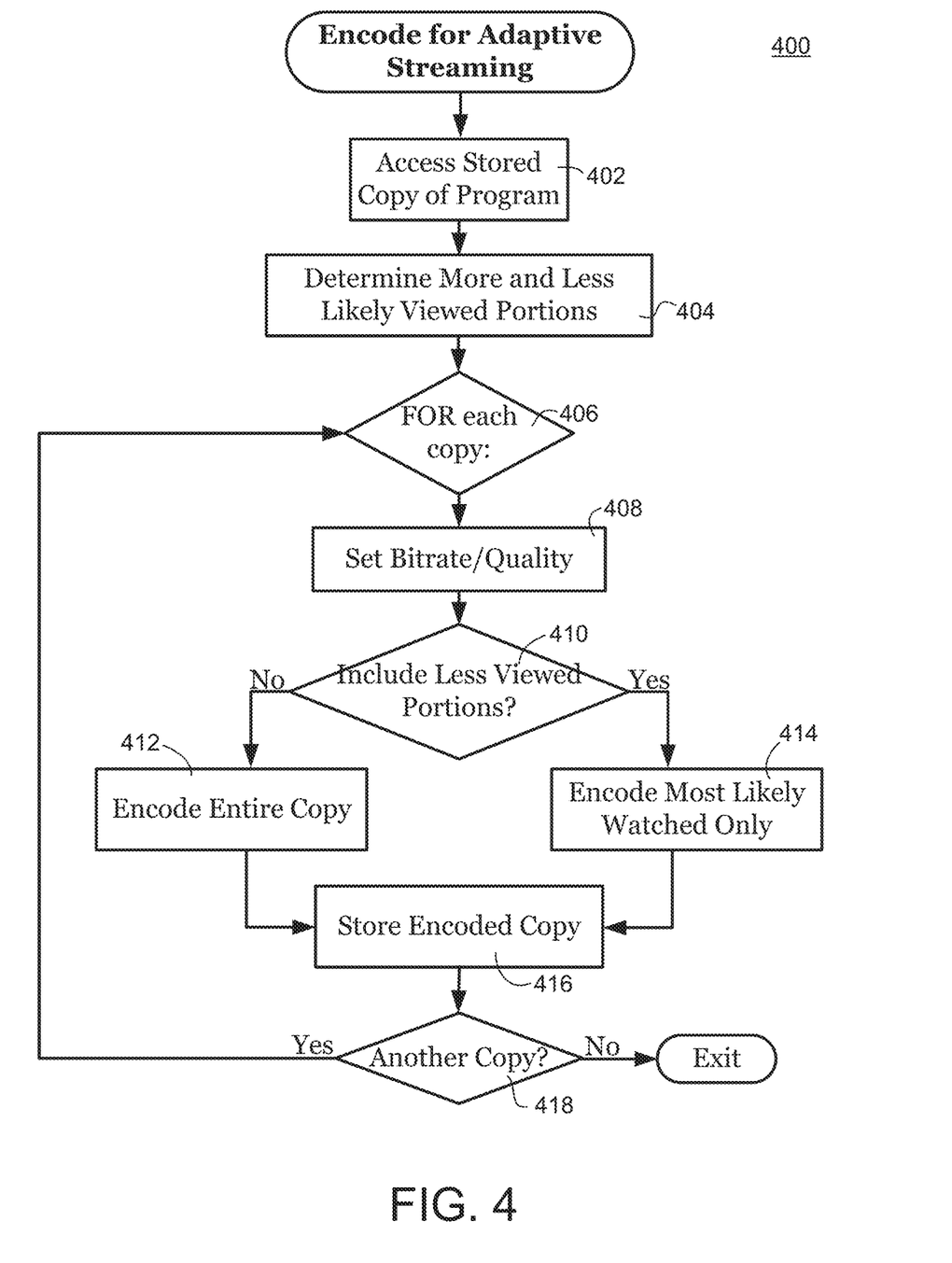
FIG. 4 is a diagram of an example process to efficiently encode multiple copies of a media program.
Figure 5:
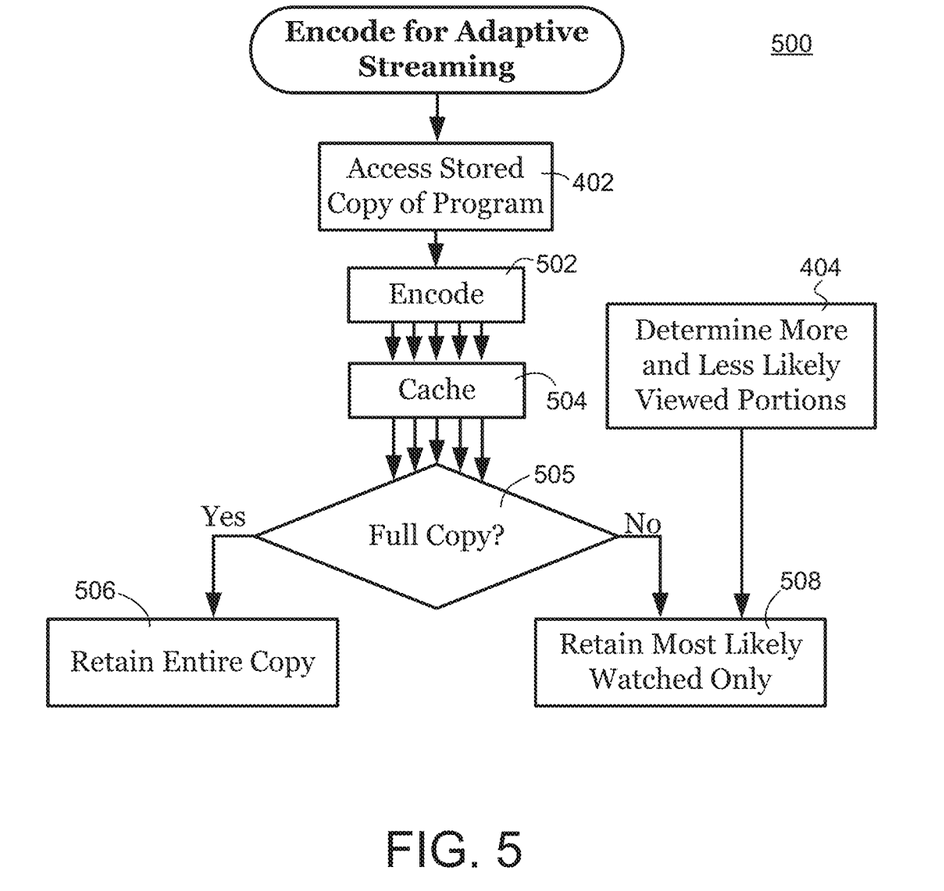
FIG. 5 is a block diagram of an example system for efficiently encoding multiple copies of a media program.

FIGS. 4 and 5 show example processes 400 and 500, respectively, to be executed by a remote or local storage DVR to encode a media program 122 for adaptive streaming. Process 400 illustrated in FIG. 4 controls the content that is maintained for each copy by skipping the encoding of less-viewed portions 202, 206, 207, whereas process 500 illustrated in FIG. 5 uses selective storage or retention of encoded content. Either process 400 or 500 can be used to reduce the amount of storage consumed by the copies of the program, and processes 400 and 500 could be combined or modified in any manner.

In various embodiments, processes 400 and 500 are executed by processor 111 or processor 141 in response to software, firmware or similar program instructions stored in memory 112 or 142, respectively. Other embodiments may equivalently execute the processes on any other devices or hardware as desired, or the various functions shown in the figures may be split between multiple processors or devices, such as in the context of cloud processing involving any number of virtual or logical processors or computing systems executing on any hardware or platform.

As noted above, adaptive encoding may begin at any time following the onset of recording (function 402). In various embodiments, encoding begins as soon as possible after the program recording begins so that the encoded program is ready for streaming as soon as possible. Modern encoding hardware is often capable of "faster than real-time encoding", thereby potentially allowing adaptive streaming of even live programming, with only minimal delay to account for processing and transmission. Other embodiments may delay encoding until after the recording is complete, if desired, particularly if encoding hardware is shared between different devices. Accessing the stored program 122, then, may begin at any time after the recording has begun.

Determining the more- and less-likely viewed portions (function 404) occurs at any time, and in any manner. As noted above, some embodiments could assume that any portion of the recording occurring before or after a scheduled time for the program is less likely to be viewed. Portions 202 and 206 in FIG. 2, for example, could be assumed to occur prior to a scheduled start time and after a scheduled end time, as desired. Other embodiments could adapt the start and end times based upon information obtained from an EPG or CMS 130, as desired. Still further embodiments could add additional portions of "less-likely" viewing based upon excitement data, CMS data and/or the like. Commercials 207, for example, could be recognized and omitted from one or more copies 215 while still allowing the commercials to be present in the remaining copies 210. In the example of FIG. 4, it is beneficial to determine the more and/or less likely-viewed portions 202, 206-207 prior to encoding so that the information can be used to determine whether certain portions should be encoded or not. Other embodiments could determine the relevant portions at a later date or time (even after encoding) so that less-interesting portions 202, 206, 207 can be deleted, thereby freeing up storage space as desired.

Encoding of the various copies can proceed in any manner. In the example of FIG. 4, functions 406-418 represent encoding of various copies of the program. Some encoders allow for parallel encoding of the different quality copies 125, thereby allowing for simultaneous execution of functions 406-418 as appropriate. Other encoders may proceed in the more sequential manner described in function 406. The flowchart of FIG. 4 is intended to show an example of how logical flow may proceed to understand the process 400, while recognizing that practical embodiments may make use of parallel processing or other optimization techniques as desired.

With continued reference to FIG. 4, each copy 125 (function 406) of program 125 will typically be encoded at a different quality (function 408). As noted above, "quality" may refer to variations in one or more parameters such as bit rate, frame rate, resolution or the like between the different copies 125. Typically, the lower quality copies 125 will be more useful for less powerful hardware, slower network connections and/or congested networks. The higher quality copies will be more useful for powerful hardware, larger screen sizes and more capable networks. The player device typically selects segments from the different copies 125 that are appropriate for the player's then-current network, processing and display capabilities.

As noted herein, at least one (ideally more than one) of the copies 125 will encode the full content of the recorded program, including portions 202 and 206 and any other portions of "lower interest". Conversely, at least one (ideally more than one) of the copies 125 will retain only the portion 204 of the program 122 that is most likely to be viewed. The particular copies 125 selected for including or excluding the less-viewed portions is a matter of design choice, and will vary widely from embodiment to embodiment.

If the copy 125 is one of the subset 210 that includes the full content (function 410), then the full content (including portions 202 and 206) can be encoded and retained (function 412). If the copy 125 is one of the subset 212 that does not include portions 202 and 206, then only the remaining portion 204 is encoded and/or retained as desired (function 414). The encoded copies 125 are stored (function 416) in storage 120 or the like for subsequent retrieval. Additional copies may be encoded as desired (function 418).

As noted above, FIG. 4 shows a process 400 in which the encoding functions 406-416 are controlled so that encoding of the less-likely-to-be-viewed portions 202, 206, 207 is skipped in certain copies 125 of the program, and only portion 204. This can reduce the demand on encoding hardware, as appropriate, by encoding only the portion 204 that is needed for those copies 125.

In process 500 of FIG. 5, the different copies are initially encoded in series or in parallel in their entirety without regard to the relevance of the different portions of the program (function 502). The encoded content may be initially cached (function 504) in storage 120 and/or in a separate storage space, as desired, until the less-likely-to-be-viewed portions 202, 206, 207 are identified (function 505). The encoded portions 202, 206, 207 are then discarded (function 508) so that the portions are no longer retained in certain copies 212. Discarding of encoded content may occur by, for example, deleting content that has been written to storage 120, by simply skipping over the unneeded portions 202, 206, 207 when encoded content is written from cache to storage 120, and/or in any other manner. Embodiments that discard the encoded content could allow for convenient parallel encoding without substantial modification to the encoder, if desired, while retaining the efficiencies of storage described herein. As noted above, some copies 210 will typically retain the full program content (function 506) for the viewer.

As noted at the outset, space on storage 120 can be conserved by reducing the amount of content that is encoded in one or more copies 125 used for adaptive streaming. By eliminating less-popular portions 202, 206, 207 of certain copies, the total amount of storage space can be reduced with little or no restriction on content that is available to the user. That is, the user is still able to view the less-popular content if desired, albeit potentially at a slightly lower quality level.

Various embodiments could modify these general concepts in any number of ways. Although the concepts are frequently described herein as being applicable to an RSDVR system that records user-selected programs for place and/or time shifted playback via a media stream, equivalent concepts could be applied to any sort of video recording system, including any sort of LSDVR, video-on-demand (VOD), or similar media streaming service implemented with any sort of personal or shared hardware.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A process executable by a computing device to store a recorded program on a storage medium, the process comprising:
determining a portion of the recorded program that is most likely to be viewed by a viewer and at least one portion of the program that is less likely to be viewed by the viewer;
encoding a plurality of encoded copies of the recorded program; and
storing the plurality of encoded copies of the recorded program on the storage medium for subsequent retrieval, wherein a first subset of the plurality of encoded copies stored on the storage medium comprises the entire recorded program, and wherein a second subset of the plurality of encoded copies stored on the storage medium comprises only the portion of the program that is most likely to be viewed by a viewer and omits the at least one portion of the program that is less likely to be viewed by a viewer, wherein the entire recorded program for each of the plurality of encoded copies is cached in a first data storage separate from the storage medium prior to the storing, and wherein the at least one portion of the program that is less likely to be viewed by a viewer for the second subset of the encoded copies is deleted from the first data storage without being stored on the storage medium.

2. The process of claim 1 wherein each of encoded copies of the recorded program is encoded at a different level of quality.

3. The process of claim 2 wherein the encoded copy of the recorded program having the highest quality is one of the second subset of encoded copies and the encoded copy of the recorded program having the lowest quality is one of the first subset of encoded copies.

4. The process of claim 3 wherein there are more copies of the recorded program in the second subset of encoded copies than in the first subset of encoded copies.

5. The process of claim 1 wherein the determining occurs after the encoding but prior to the storing.

6. A process executable by a computing device to store a recorded program on a storage medium, the process comprising:
determining a portion of the recorded program that is most likely to be viewed by a viewer and at least one portion of the program that is less likely to be viewed by the viewer;
encoding a plurality of encoded copies of the recorded program; and
storing the plurality of encoded copies of the recorded program on the storage medium for subsequent retrieval, wherein a first subset of the plurality of encoded copies stored on the storage medium comprises the entire recorded program, and wherein a second subset of the plurality of encoded copies stored on the storage medium comprises only the portion of the program that is most likely to be viewed by a viewer and omits the at least one portion of the program that is less likely to be viewed by a viewer, wherein the determining occurs prior to the encoding, and wherein the encoding comprises encoding only the portion of the program that is most likely to be viewed by a viewer without encoding the at least one portion of the program that is less likely to be viewed by a viewer for the second subset of the plurality of encoded copies.

7. The process of claim 6 wherein the determining comprises receiving a message from a content management system that indicates a start time of the recorded program.

8. The process of claim 7 wherein the portion of the recorded program that is most likely to be viewed by a viewer begins at the start time, and wherein the at least one portion of the program that is less likely to be viewed by the viewer comprises a portion of the recorded program occurring prior to the start time indicated by the content management system.

9. The process of claim 6 wherein the portion of the recorded program that is most likely to be viewed by a viewer begins at a scheduled start time, and wherein the at least one portion of the program that is less likely to be viewed by the viewer comprises a portion of the recorded program occurring prior to the scheduled start time.

10. The process of claim 6 wherein each of the encoded copies of the recorded program is encoded at a different level of quality.

11. The process of claim 10 wherein the encoded copy of the recorded program having the highest quality is one of the second subset of encoded copies.

12. The process of claim 11 wherein the encoded copy of the recorded program having the lowest quality is one of the first subset of encoded copies.

13. The process of claim 6 wherein there are more copies of the recorded program in the second subset of encoded copies than in the first subset of encoded copies.

14. A computing device comprising a processor, a data storage and an interface to a network, wherein the processor executes an automated process to deliver an adaptive media stream via the network representing a recorded program that is stored on the storage device, the automated process comprising:
- determining a portion of the recorded program that is most likely to be viewed by a viewer and at least one portion of the program that is less likely to be viewed by the viewer;
- encoding a plurality of encoded copies of the recorded program; and
- storing the plurality of encoded copies of the recorded program on the storage medium for subsequent retrieval and delivery via the network, wherein a first subset of the plurality of encoded copies stored on the storage medium comprises the entire recorded program, and wherein a second subset of the plurality of encoded copies stored on the storage medium comprises only the portion of the program that is determined to be most likely to be viewed by a viewer and omits the at least one portion of the program that is determined to be less likely to be viewed by a viewer, wherein the entire recorded program for each of the plurality of encoded copies is cached in a first data storage separate from the storage device prior to the storing, and wherein the at least one portion of the program that is less likely to be viewed by a viewer for the second subset of the encoded copies is deleted from the first data storage without being copied the storage device.

15. The computing device of claim 14 wherein each of the encoded copies of the recorded program is encoded at a different level of quality.

16. The computing device of claim 14 wherein the determining occurs after the encoding but prior to the storing.

17. The computing device of claim 14 wherein the encoded copy of the recorded program having the highest quality is one of the second subset of encoded copies and the encoded copy of the recorded program having the lowest quality is one of the first subset of encoded copies, and wherein there are more copies of the recorded program in the second subset of encoded copies than in the first subset of encoded copies.

18. A computing device comprising a processor, a data storage and an interface to a network, wherein the processor executes an automated process to deliver an adaptive media stream via the network representing a recorded program that is stored on the storage device, the automated process comprising:
- determining a portion of the recorded program that is most likely to be viewed by a viewer and at least one portion of the program that is less likely to be viewed by the viewer;
- encoding a plurality of encoded copies of the recorded program; and
- storing the plurality of encoded copies of the recorded program on the storage medium for subsequent retrieval and delivery via the network, wherein a first subset of the plurality of encoded copies stored on the storage medium comprises the entire recorded program, and wherein a second subset of the plurality of encoded copies stored on the storage medium comprises only the portion of the program that is determined to be most likely to be viewed by a viewer and omits the at least one portion of the program that is determined to be less likely to be viewed by a viewer, wherein the determining occurs prior to the encoding, and wherein the encoding comprises encoding only the portion of the program that is most likely to be viewed by a viewer without encoding the at least one portion of the program that is less likely to be viewed by a viewer for the second subset of the plurality of encoded copies.

19. The computing device of claim 18 wherein the encoded copy of the recorded program having the highest quality is one of the second subset of encoded copies and the encoded copy of the recorded program having the lowest quality is one of the first subset of encoded copies, and wherein there are more copies of the recorded program in the second subset of encoded copies than in the first subset of encoded copies.

20. The computing device of claim 18 wherein each of the encoded copies of the recorded program is encoded at a different level of quality.

* * * * *